United States Patent [19]

Funderburg

[11] 4,228,373
[45] Oct. 14, 1980

[54] ELECTROMAGNETIC MOTOR

[76] Inventor: William S. Funderburg, 2103 Pender Ave., Wilmington, N.C. 28403

[21] Appl. No.: 74,018

[22] Filed: Sep. 10, 1979

Related U.S. Application Data

[63] Continuation-in-part of Ser. No. 857,772, Dec. 5, 1977, Pat. No. 4,179,631.

[51] Int. Cl.³ .............................................. H02K 7/06
[52] U.S. Cl. ........................................ 310/20; 310/32
[58] Field of Search ....................... 310/15, 20, 22, 21, 310/23, 24, 34, 35, 32, 33, 27

[56] References Cited

U.S. PATENT DOCUMENTS

| | | | |
|---|---|---|---|
| 1,198,934 | 9/1916 | LeGrande | 310/22 |
| 1,428,489 | 9/1922 | Mace | 310/354 |
| 1,703,997 | 3/1929 | Greenwood | 310/32 |
| 3,718,829 | 2/1973 | Wilson | 310/204 |
| 4,179,631 | 12/1979 | Funderburg | 310/20 |

FOREIGN PATENT DOCUMENTS 550249 12/1942 United Kingdom ...................... 310/32

Primary Examiner—Donovan F. Duggan

[57] ABSTRACT

A pair of spaced, toroidal-shaped, electromagnetic coils, when supplied with alternating DC current, cause a floating armature to reciprocate therebetween. The armature itself includes a second pair of back to back, toroidal-shaped electromagnetic coils mounted on a non-conductive linear output drive rod which extends through an opening in at least one of the first mentioned pair of coils to deliver the force generated by the reciprocating armature to a suitable force transmitting mechanism. The armature floats between the first pair of electromagnets and is so positioned with respect thereto that its path of movement is totally between the two opposed electromagnetic coils and never enters the central opening formed therein, whereby frictional losses are eliminated, the strength of the magnetic flux field is maximized and the magnetic force generated by each electromagnet acts more consistently over the entire armature throughout its path of movement.

3 Claims, 7 Drawing Figures

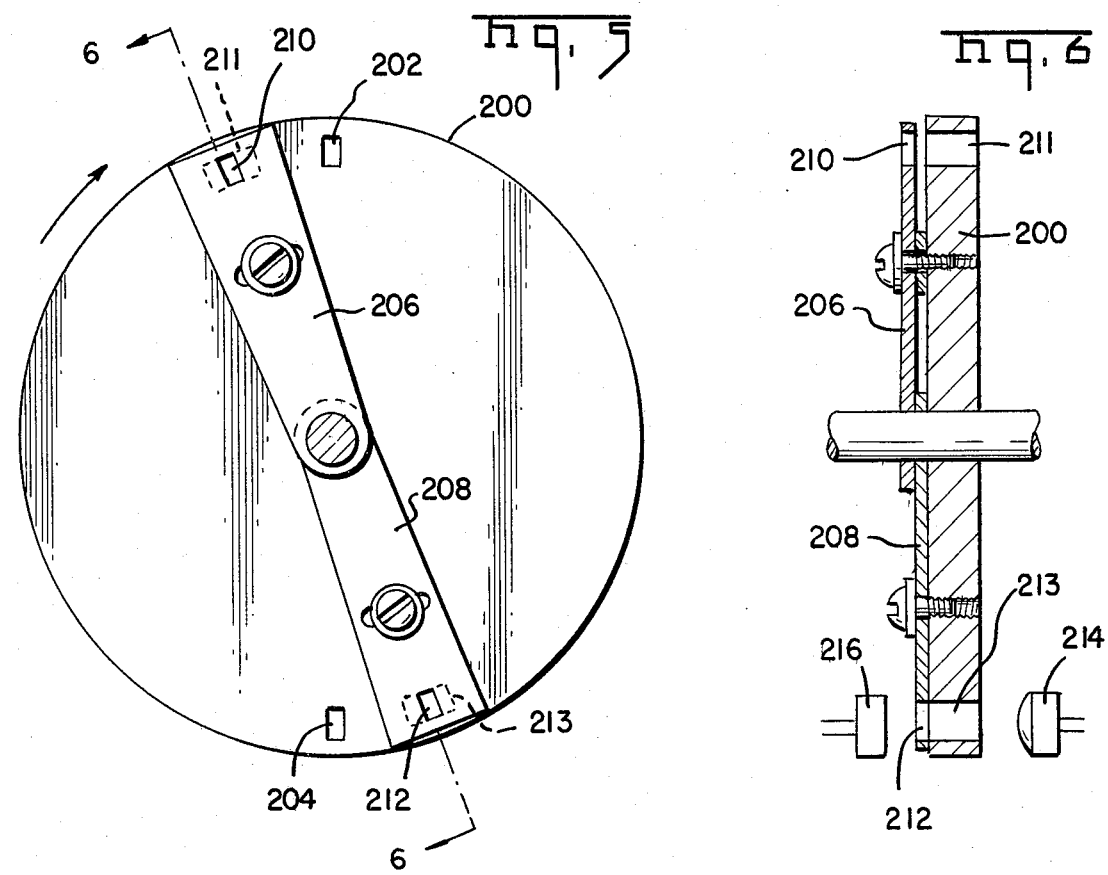
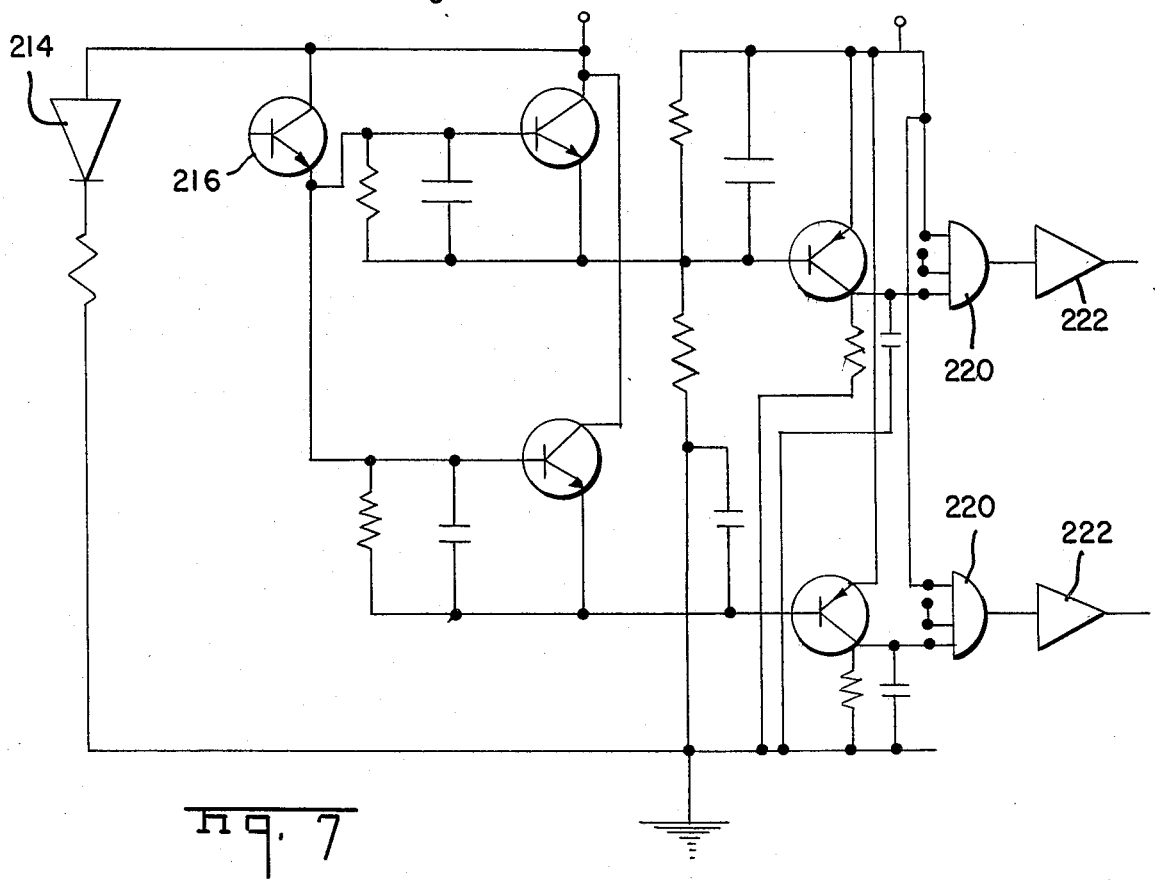

ELECTROMAGNETIC MOTOR

REFERENCE TO RELATED APPLICATIONS

This application is a continuation-in-part of applicant's co-pending application Ser. No. 857,772, filed Dec. 5, 1977 and now issued as U.S. Pat. No. 4,179,631, granted 12/18/79.

BACKGROUND OF THE INVENTION

With the increased emphasis on the minimizing of air polluting and noise polluting gasoline type engines, there has been a revived interest in the use of electric motors for propelling vehicles and operating other types of equipment that were formerly propelled and operated by gasoline type engines. Vehicle engines powered by electric motors, as such, are not new and there have been electric automobiles, and other vehicles, such as golf carts around for many years. However, most of such approaches use voltage from a battery or other direct current source which directly operates a rotating shaft, resulting in a terrific drain on the batteries with the attendant significant limitation in the range of such vehicles.

One approach which limits the drain on the batteries and increases the range of the vehicle is the use of the batteries to activate one or more solenoids, the iron rod or plunger of which is caused to reciprocate responsive thereto. The reciprocation of the plunger of the solenoid is caused to operate a drive shaft as is illustrated in the Gelnaw U.S. Pat. No. 2,056,719; the Bock U.S. Pat. No. 424,535; and the Moodyman U.S. Pat. No. 1,886,040. While an improvement to the direct approach discussed hereinabove, there are still several disadvantages to the solenoid approach which include: frictional losses between the plunger and the coil as the plunger reciprocates; relatively weak magnetic flux field limits power output; the magnetic attraction acts only over a portion of the entire plunger at any one time; and the pulling and pushing force is relatively inconsistent depending upon the position of the magentic plunger within the flux field. As a result, such approaches have not been successful for the movement of relatively large vehicles where the application of significant force is required and have been limited to rather small pumps as illustrated in the Morgan U.S. Pat. No. 3,134,938.

SUMMARY OF THE PRESENT INVENTION

The present invention, on the other hand, while using electromagnets to activate an armature back and forth to develop linear energy, overcomes the aforementioned problems in a unique way. First of all, the solenoid is replaced by a pair of spaced, toroidal-shaped electromagnet coils with the armature positioned entirely between the two magnets and being of such diameter that is greater than the central opening in the electromagnets so that the armature does not reciprocate back and forth within the confines of the electromagnetic coil. The two coils are generally similar to the effect which would be achieved by two lifting electromagnets placed in confronting relationship and alternately energized. The electromagnets and armature are preferably enclosed within a cylinder housing formed of a cylindrical shell having a non-conductive lining and two ends or heads. The heads have a central opening therein and a roller bearing surrounding the opening receives and supports the non-conductive shaft extending outwardly from the armature in either direction. While a cylindrical housing enclosing the electromagnets and armature are preferred, the cylindrical shell is not entirely necessarily, as long as the electromagnets are fixed in stationary relation with the armature supported on the non-conductive shaft. A source of direct current energy is applied to the electromagnets alternately so that the armature is caused to reciprocate back and forth within the housing causing a resulting movement of the drive rod back and forth. This energy can be transmitted to a drive shaft. Several of such electromagnetic motors may be connected to the drive shaft so that considerable work can be exerted, sufficient to propel the vehicle.

A switching mechanism is electrically connected between the source of direct current (battery) to switch the voltage back and forth between the two coils. Further the reciprocal motion of the armature creates AC current within the coils which can be utilized to keep the battery recharged.

In an alternate embodiment, the armature or armature means itself is an electromagnet and is formed by mounting a second pair of toroidal-shaped electromagnetic coils on the non-conductive shaft or drive rod and modifying the switching mechanism to also switch the direct current back and forth between the second pair of electromagnetic coils whereby the armature is repelled by the one of the first pair of coils it is leaving while it is simultaneously attracted by the other of the first pair of coils.

It is therefore an object of the present invention to provide an improved electromagnetic motor which maximizes energy output therefrom, yet is quiet and utterly free of air polluting elements.

It is another object of the present invention to provide an improved electromagnetic motor of the type described in which the armature floats within a cylinder housing between two alternately excited electromagnetic coils.

It is another object of the present invention to provide an improved electromagnetic motor in which the arrangement of the electromagnets and armature minimizes or substantially eliminates frictional losses, and acts consistently over the entire armature throughout its path of movement.

It is yet another object of the present invention to provide an improved electromagnetic motor of the type described in which the armature itself is electromagnetically charged to provide a more reliable and faster working motor.

Other objects and a fuller understanding of the invention will become apparent from reading the following detailed description of a preferred embodiment in association with the accompanying drawings in which:

FIG. 5 is a front view of a proposed pulse disc utilized in the control circuit of the alternate embodiment.

FIG. 6 is a sectional view taken through the disc illustrated in FIG. 5.

FIG. 7 is a schematic illustration of the electrical circuitry of a switching mechanism of the alternate embodiment.

DETAILED DESCRIPTION OF A PREFERRED EMBODIMENT

Figure 1:
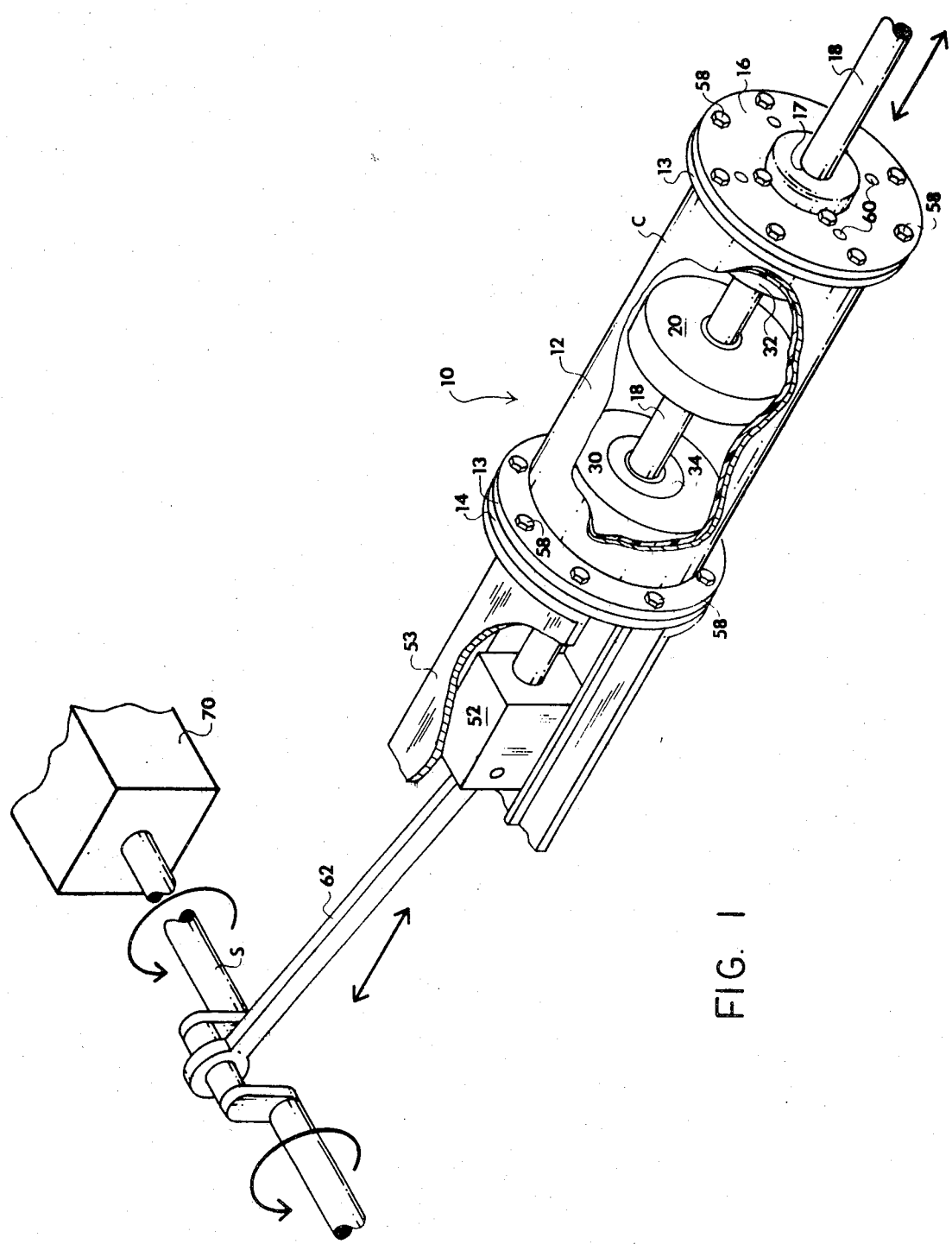
FIG. 1 is a perspective view, with portions broken away, of the electromagnetic motor according to the present invention.
Figure 2:
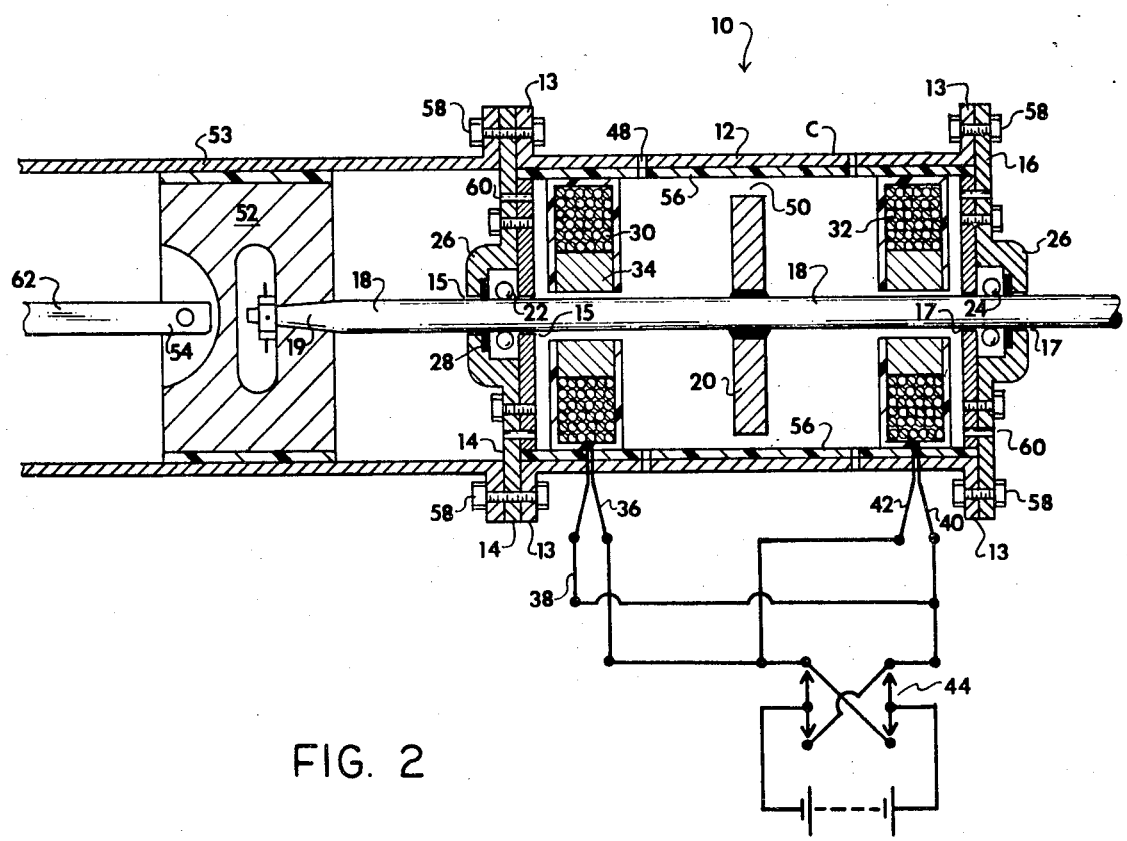
FIG. 2 is a sectional view of the motor illustrated in FIG. 1.

Turning now to the drawings and particularly first of all to FIGS. 1 and 2, there is illustrated a single electromagnetic motor 10 of the type contemplated by the present invention. It should be apparent that the motor 10 herein illustrated and described can be combined or grouped with other motors to provide additional energy input to a drive shaft or other energy transmitting device.

In general the electromagnetic motor according to the present invention preferably includes a cylinder housing C including a cylindrical shell 12 enclosed at either end by a front cylinder head 14 and a rear cylinder head 16. While a cylindrical shell enclosing the electromagnets and armature is preferable it is not absolutely necessary, as long as the electromagnets are stationarily mounted in spaced relation to each other. At least the front cylinder head 14, and preferably both cylinder heads 14,16 include a central opening 15,17 therein. A reciprocating armature 20 is secured to a non-conducting drive rod 18 (formed of or coated with a non-conducting material) and supported within the cylindrical shell 12 thereby. The drive rod 18 is movably received within the openings 15,17 and provide the means for supporting the armature for reciprocal motion therein as will be described more fully hereinafter. A pair of toroidal-shaped, bifilar wound electromagnetic coils 30,32 are stationarily mounted inside the front and rear end of the cylindrical housing C adjacent the front and rear cylinder heads 14,16, and each coil 30,32 includes a central opening therein aligned with the opening 15,17 in the adjacent cylinder head 14,16.

The arrangement and positioning of the electromagnetic coils relative to the armature is such that upon activation of the armature 20 its path of movement is between coils 30,32 and does not enter the central opening in either coil.

A source of direct current 46 is alternately connected to the coils 30,32 by means of a switching means 44 so arranged as to cause the direct current to flow first to one coil and then to the other.

The free end of the drive rod 18 is connected to a force transmitting means for delivering the force generated by the motor as described hereinabove to a using mechanism 70. For example, the drive rod 18 may be connected to a rotatable drive shaft by some type of connecting rod 62. Reciprocal motion of the armature 20 will cause a resulting rotation of the drive shaft S as illustrated in FIGS. 1 and 2.

Turning now to the embodiment illustrated in FIGS. 1 and 2 in more detail the cylindrical shell 12 includes a flange 13 at either end thereof, to which the front and rear cylinder heads 14,16 are bolted by means of anchor bolts 58. Each cylinder head 14,16 is provided with a shaft supporting, anti-friction roller bearing 22,24 held within the central openings 15,17 by means of bearing retainers 26, which, in turn, are further provided with dust seals 28 therein which protect the bearings. The bearings 22 provide the sole means of support for the drive rod 18. As illustrated drive rod 18 extends forwardly and rearwardly from either side of the armature, however, with proper bearing design, it might be possible to eliminate the rear portion of the drive rod 18, and merely have the rod 18 extend through the front head. In such a case, the rear head would be a solid plate member.

The cylinder shell 12 is provided with air vents 48 and the diameter of the armature 20 is less than the inner dimension of the shell 12 so that an air space or gap 50 exists between the periphery of the armature 20 and the lining 56 of the shell 12. Lining 56 should be of a non-conductive material. The cylinder heads are further provided with air vents 60 for maintaining a continuous atmospheric pressure inside the cylindrical housings C. Without the air vents, continuous, alternating conditions of positive and negative would occur on either side of the armature as it moved back and forth.

Each of the magnetic coils is formed by a toroidal winding around a core 34. A pair of leads 36,38 connect the poles of the front electromagnetic to the switching means 44, and a second pair of leads 40,42 connect the poles of the rear electromagnet 32 to the switching means 44.

The front or free end 19 of drive rod 18 is mechanically linked to the drive shaft S according to many conventional linkage systems, however, one possible way is to connect the drive rod 18 to a cross-head flasher piston 52 which reciprocates within a pair of guides 53 responsive to the movement of armature 20. A rod flasher 54 is connected to the front end of the flasher piston 52 and so connected to the drive shaft S as to impart a rotary motion thereto responsive to the reciprocal motion of the electromagnetic motor. As mentioned hereinabove, several of the motors 10 may be grouped with the drive rods 18 of each connected to the drive shaft in the same or a similar manner as described hereinabove for increasing the power input to the drive shaft.

Figure 3:
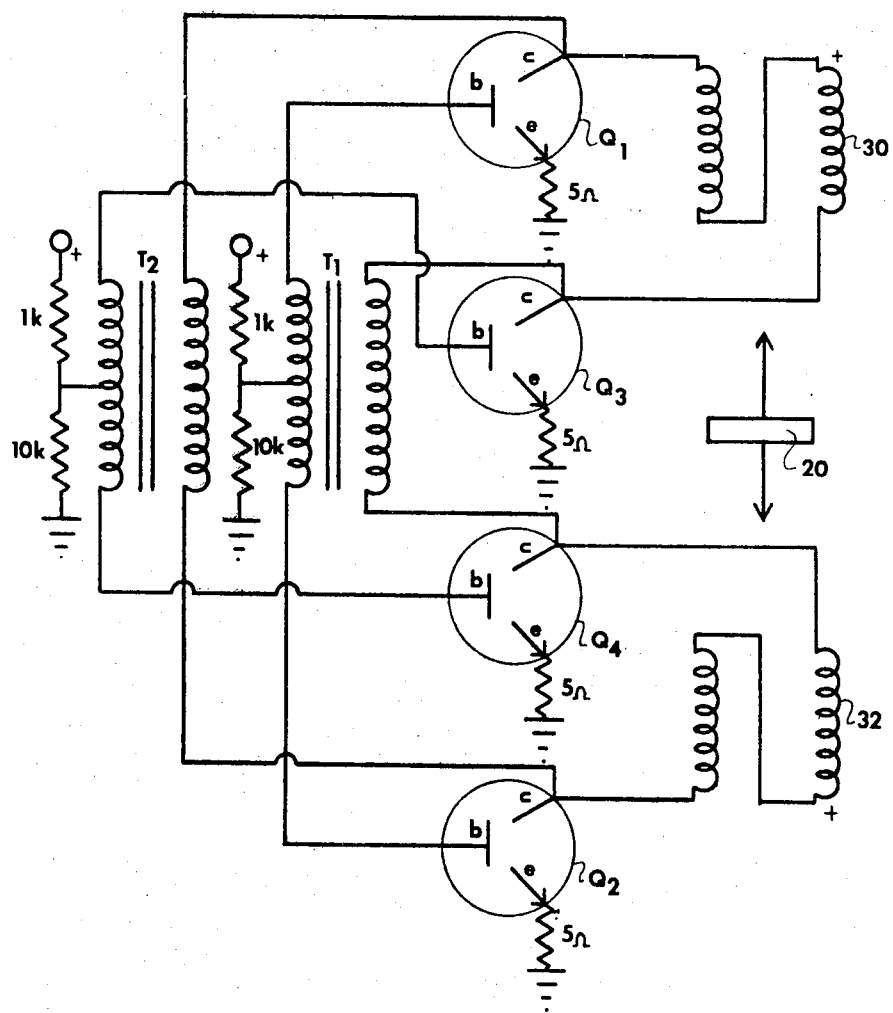
FIG. 3 is a schematic illustration of the electrical circuitry of the switching mechanism which alternates the direct current source from one coil to the other, and further illustrating the recharging circuitry.

The switching of the voltage to each of the electromagnets may be carried out according to any of various well known arrangements, either responsive to the reciprocal movement of the armature 20 as by limit switches or the like (mechanical activation) or by a timed pulse arrangement (electrical activation). One example of a suitable arrangement (the electrical approach) is illustrated in FIG. 3. As there illustrated, a pair of small drive transformers T1,T2 having the primary windings thereof connected to the base of one of four NPN type transistors Q1-Q4, while the secondary windings or impedance sides are connected to the collectors of the transistors, which are also connected to the leads of the electromagnets 30,32, as illustrated in FIG. 3.

When voltage is applied to the positive poles of transformer T1, transistor Q1 is in the conductive state, current is flowing from the emitter to the collector thereof to the top of the electromagnetic coil 30 which attracts the piston. While Q1 is conducting current through the impedance side of transformer T2, a portion of the current is flowing to the collector of Q2 which is not conductive at this time. This will bias the base of Q1 and causes it to turn off, while Q2 is now conducting current from the emitter to the collector, causing the actuation of electromagnetic coil 32. As this coil energizes causing the piston to travel, voltage passes through the collector of Q2 to the primary of transformer T2 back to the collector of Q1 to electromagnetic coil 30 which induces a reverse polarity to transformer T1. This induces a positive signal to transistor Q1 and a negative signal to Q2 (turning it off). Q1 is now back in the conductive state. Transistor Q3 and Q4 operate similarly with transformer T2.

In operation, as the direct current is applied to the switching means 44, the direct current voltage source is alternatingly introduced to the front and rear electromagnetic coils 30,32 causing the piston armature to reciprocate. As it traverses one of the fields, it also traverses partially the other field and is actually being repelled from one of the electromagnets toward the other as a result of the time lag in the field which occurs when the current is shifted from one magnetic coil to the other.

The result of the electronic switching circuit causes the armature to reciprocate will develop alternating DC current within the system which can be fed through the alternator and used to recharge the source of direct current much the same as a vehicle battery does by means of the generator and alternator in conventional automobiles.

Figure 4:
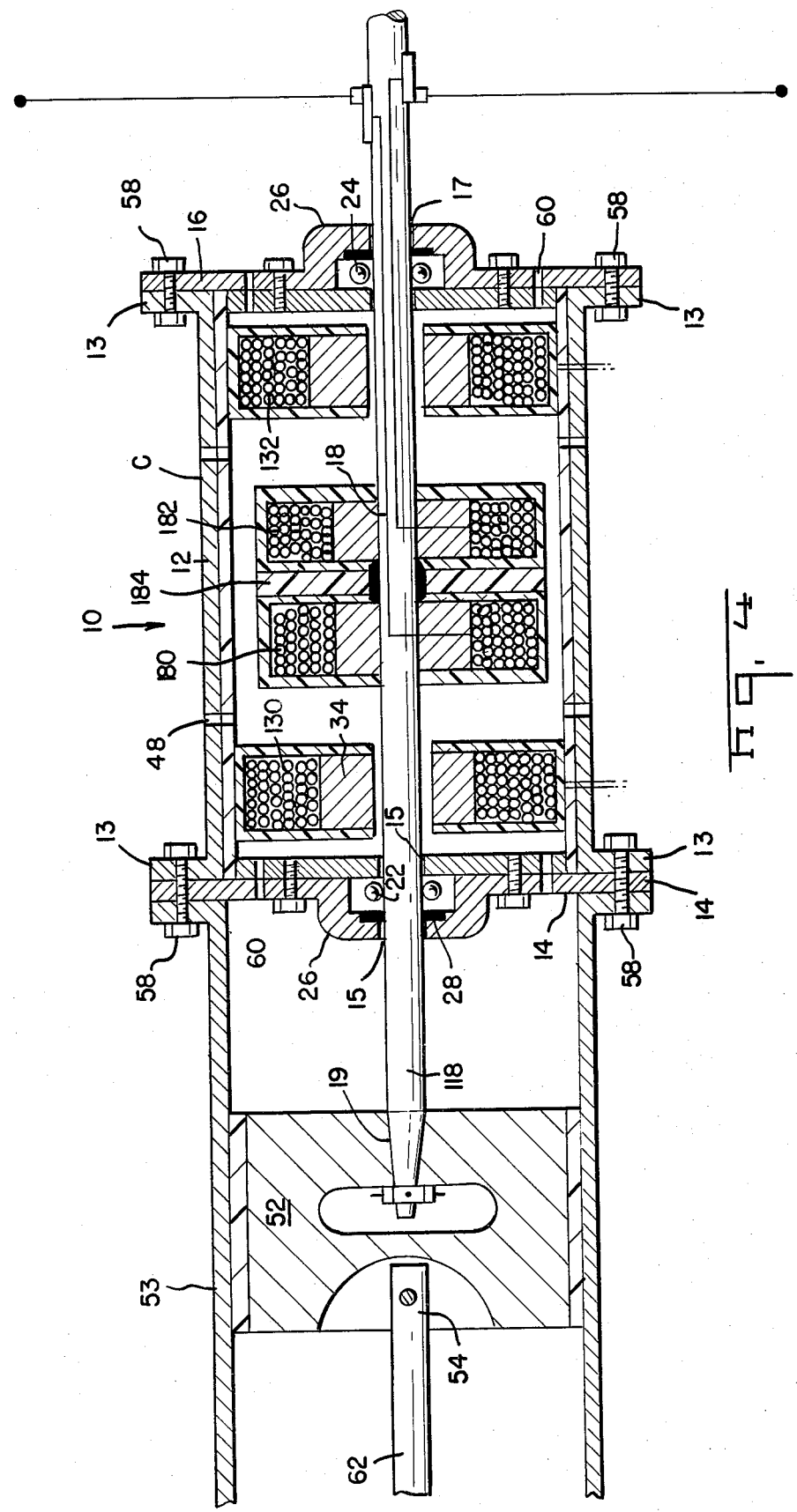
FIG. 4 is a sectional view similar to FIG. 2 except showing an alternate embodiment of the electromagnetic motor.

Turning now to FIGS. 4-6 and referring to the description of the preferred embodiment, in general the same mechanical setup is envisioned with the exception that the armature 120 is now itself formed of two toroidal-shaped, bifilar wound spun glass, electromagnets 180,182 with a dielectric spacer 184 therebetween. Both the electromagnets 180,182 and the dielectric spacer 184 are mounted on drive rod 118, which is itself non-conductive as in the first embodiment. Each of the electromagnets includes a pair of wires 186,188 embedded in the non-conductive, non-magnetic shaft 118 leading to a point outside the electromagnets 130,132. As illustrated in FIG. 4, the wires 186,188 extend out the rear end of the cylindrical housing 12; however, it is apparent they could also extend out the front end. The drive rod 118 includes a pair of field pole touching bars 190,192 on the surface thereof, each of the touching bars being connected to one of the wires 186, 188. During reciprocation of the drive rod 118, the field pole touching bars 190,192 are constantly in touch with a brush 194,196 respectively mounted adjacent thereto, which brush carries current from the electrical circuit into the electromagnets 180,182.

FIGS. 5 and 6 are illustrative of a proposed mechanical timing control and electrical timing circuit respectively for the alternate embodiment illustrated in FIG. 4. Looking at the mechanical control, there is provided a pulse disc 200 of conventional design and commercially available, mounted on drive shaft S of FIG. 1. It should be kept in mind that drive shaft S is the drive shaft being rotated by the working of motor 110 through the non-conductive shaft or drive rod 118. The disc 200 includes a first set of fixed openings or slots 202,204 preferably spaced apart 180°. A pair of arms 206,208 are adjustably mounted to the pulse disc 200, each carrying its own slot 210,212 therein which cooperates with elongated arcuate openings 211,213 respectively in the disc 200 therebehind to provide a pair of secondary, adjustable control slots. A light emitting diode 214 is mounted in front of the pulse disc 200 while a photosensitive transistor 216 is mounted therebehind, so that light from the diode is transmitted to the transistor 216 as a slot passes the diode. The arcuate length of slots 202,204,210, and 212 determines the amount of time that each coil 130,132, 180,182 are activated to attract or repel.

The purpose of the pulse disc 200 is to control the generation of the pulse signals in the electrical circuitry illustrated in FIG. 6 in order to turn electromagnets 130,132, 180, and 182 on and off independently. As hereinabove stated, the pulse disc 200 is attached to the drive shaft S of FIG. 1 and rotates (clockwise in FIG. 4) with the shaft whenever the drive rod 118 oscillates. Also pulse disc 200 is completely enclosed to prevent stray light from entering th photosensitive transistor 216.

The purpose of the time slot 202, which is fixed, is to control the time of actuation of the electromagnetic coil 130. On the other hand slot 210 is adjustable and used to control the time of actuation of the adjacent electromagnetic coil 180 in the armature 120 used for repulsion. Ideally the slot 210 is so adjusted as to activate the repelling coil 180 just prior to the time armature 120 reaches its extreme leftmost position to aid in starting the armature back toward the other end. When the photosensitive transistor 216 senses light from the light emitting diode 214 through one of the timing slots 202,204,210,212, the transistor 216 will turn on. A corresponding transistor Q1 will then also turn on as a result of the positive voltage being applied to its base. Transistor Q2 will turn off as a result of the positive voltage being applied to its base by the turning on of transistor Q1. The upper three inputs of the four input NAND gate 220 will also be high level, whereas the lower input will change from high level to low level as transistor Q2 is changed from on to off. If Q2 is off (as when the photosensitive transistor 216 senses light) then the low level input of the NAND gate 220 will be high level. This results in the output signal of the inverter 222 being low level.

When the photosensitive transistor 216 does not sense light from the light emitting diode 214, it is turned to the off state and transistor Q1 will also turn off, causing transistor Q2 to turn on making the input 9 of the NAND gate 220 become high level and the NAND gate output to become low level. The signal from the output of the inverter then becomes high level causing no change in the polarity of the electromagnet 130. Thus when slot 202 passes the photosensitive transistor 216 coil 130 is activated to attract armature 120, and when slot 210 passes transistor 216 coil 180 is activated to repel armature 180. Subsequently electronic switches in the circuit deactivate both coils 130 and 180. The signal for the coil 132 and its associated armature coil 182 works in the same way with a similar branch as shown in FIG. 6, with the exception the output of the inverter of such branch operates the coils 132 and 182 instead of coils 130 and 180. In this manner, activation of the electromagnets is thus achieved.

Although a preferred embodiment of the present invention has been described in detail hereinabove, it is obvious that various changes and modifications might be made without departing from the scope of the invention which is set forth in the following claims.

What is claimed is:

1. An electromagnetic motor comprising:
   (a) a first pair of stationary toroidal-shaped, bifilar wound electromagnetic coils mounted in spaced relationship along an axis extending through the center of each coil, at least one of said coils being designated as a front end coil and having a central opening therein;
   (b) an armature means having a drive rod extending therefrom and through said central opening, bearing means aligned with said central opening for supporting said drive rod therein, said armature being thereby mounted for reciprocal movement in said cylinder housing;

(c) said armature means comprising a second electromagnetic coil means attached to said drive rod and movable therewith relative to said first pair of coils, said second coil means being so arranged that its polarity, when activated, is the same as the polarity of the adjacent one of said first pair of coils;

(d) the arrangement and positioning of the magnetic coils and the armature being such that, upon activation of said armature, its path of movement is between said coils only and not within the central opening therein;

(e) a source of direct current and a switching means connecting said source of DC with said first pair of magnetic coils and said second magnetic coil means in such a manner that each of the first pair of coils is alternately activated and during a portion of the time each of said first pair of coils is activated, the second magnetic coil means is activated, whereby as the armature means is attracted to each one of the first pair of coils it is then repelled by the same one of said first pair as said one coil is closely approached;

(f) a force transmitting means connected to the free end of said drive rod for delivering the force generated by said motor to a mchanism.

2. The electromagnetic motor according to claim 1 wherein said second electromagnetic coil means comprises a second pair of toroidal-shaped, bifilar wound coils arranged in back to back relation, each of said second pair of coils are so wound as to have th same polarity as the adjacent one of said first pair of coils.

3. The electromagnetic motor according to claim 2 in which said second pair of coils are separated by a disc of a dielectric material.

* * * * *